Oct. 7, 1947.        H. N. NUTT        2,428,500
SHIPPING CRATE FOR AUTOMOBILE MOTORS
Filed July 17, 1944        3 Sheets-Sheet 1

INVENTOR.
HOWARD N. NUTT
BY Edward M. Apple
ATTORNEY

Oct. 7, 1947.   H. N. NUTT   2,428,500
SHIPPING CRATE FOR AUTOMOBILE MOTORS
Filed July 17, 1944   3 Sheets-Sheet 2
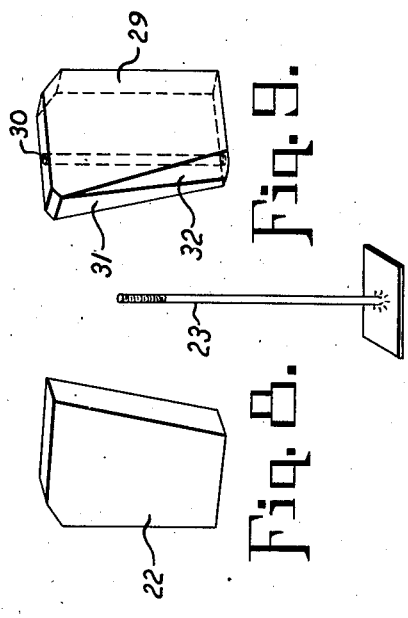
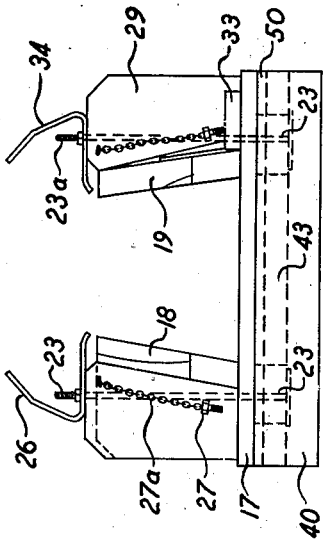
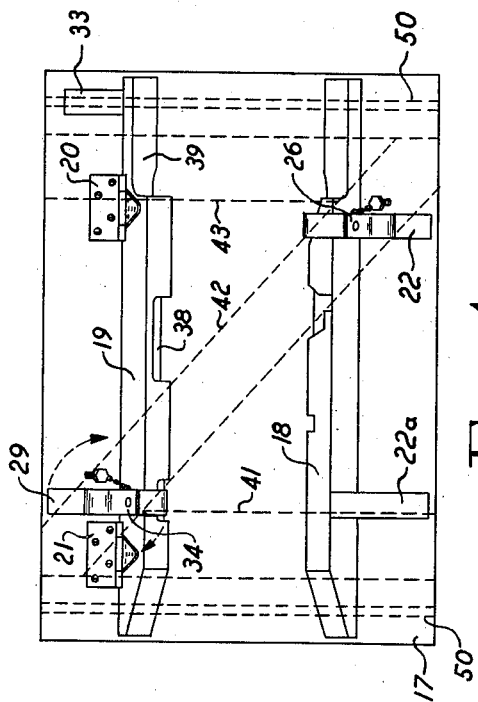
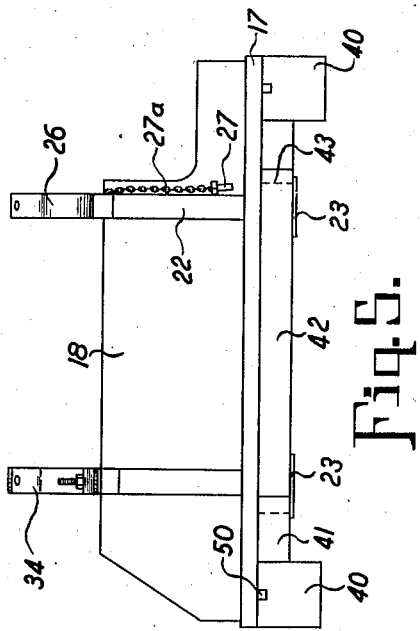
INVENTOR.
HOWARD N. NUTT
BY Edward M. Apple
ATTORNEY Oct. 7, 1947.  H. N. NUTT  2,428,500
SHIPPING CRATE FOR AUTOMOBILE MOTORS
Filed July 17, 1944  3 Sheets-Sheet 3
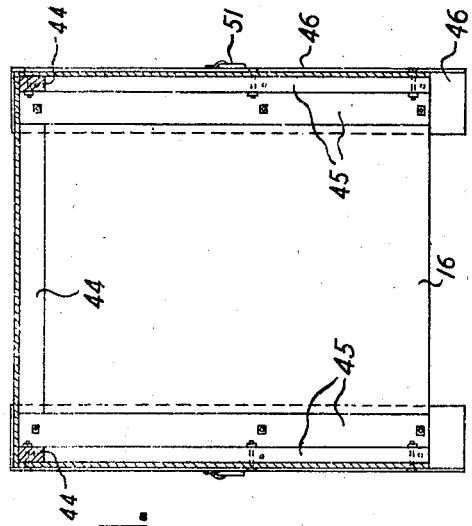
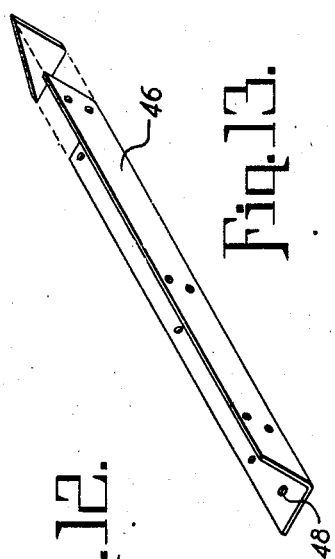
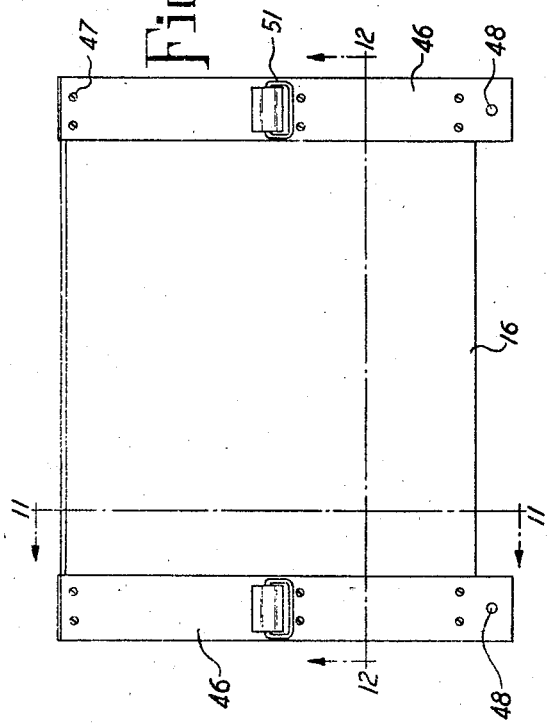
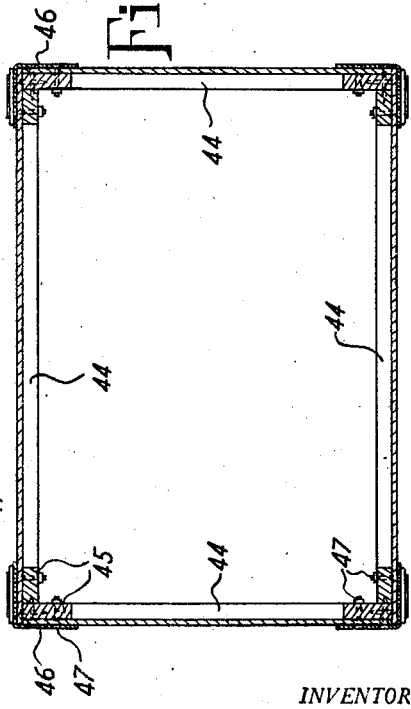
INVENTOR.
HOWARD N. NUTT
BY
ATTORNEY Patented Oct. 7, 1947

2,428,500

UNITED STATES PATENT OFFICE 2,428,500

SHIPPING CRATE FOR AUTOMOBILE MOTORS

Howard N. Nutt, Detroit, Mich.

Application July 17, 1944, Serial No. 545,265

4 Claims. (Cl. 206—46)

1

This invention relates to automobile accessories and has particular reference to a combination shipping crate and assembly stand for automobile motors.

An object of the invention is the provision of a device which is universally applicable to the shipment, assembling, and displaying of all types and models of automobile motors, such as the Ford V8, Chevrolet, Dodge, Plymouth, and others.

Another object of the invention is the provision of a device of the character referred to, with which an automobile motor may be easily handled manually during shipment.

Another object of the invention is the provision of a device of the character referred to, in which an automobile motor may be cradled for easy handling by various types of hoisting machinery.

Another object of the invention is the provision of a device by which an automobile motor may be stored or shipped in dust-proof and moisture-proof condition, and secured against any possibility of being damaged in transit.

Another object of the invention is the provision of a novel crate for the shipment of an automobile motor from which the motor is easily removed.

Another object of the invention is the provision of a fully enclosed shipping crate from which the cover is easily removed to make an ideal assembly stand or showroom display mounting for an automobile motor.

Another object of the invention is the provision of a novel shipping container for an automobile motor which protects the motor against the possibility of anyone tampering with it during transportation.

The foregoing and other objects and advantages of the invention will become more apparent as the description proceeds, reference being made from time to time to the accompanying drawings forming part of the within disclosure, in which drawings:

Fig. 4 is a top plan view of the motor cradle illustrated in Fig. 1.

Fig. 5 is a side elevational view of the motor cradle.

2

Figure 1:
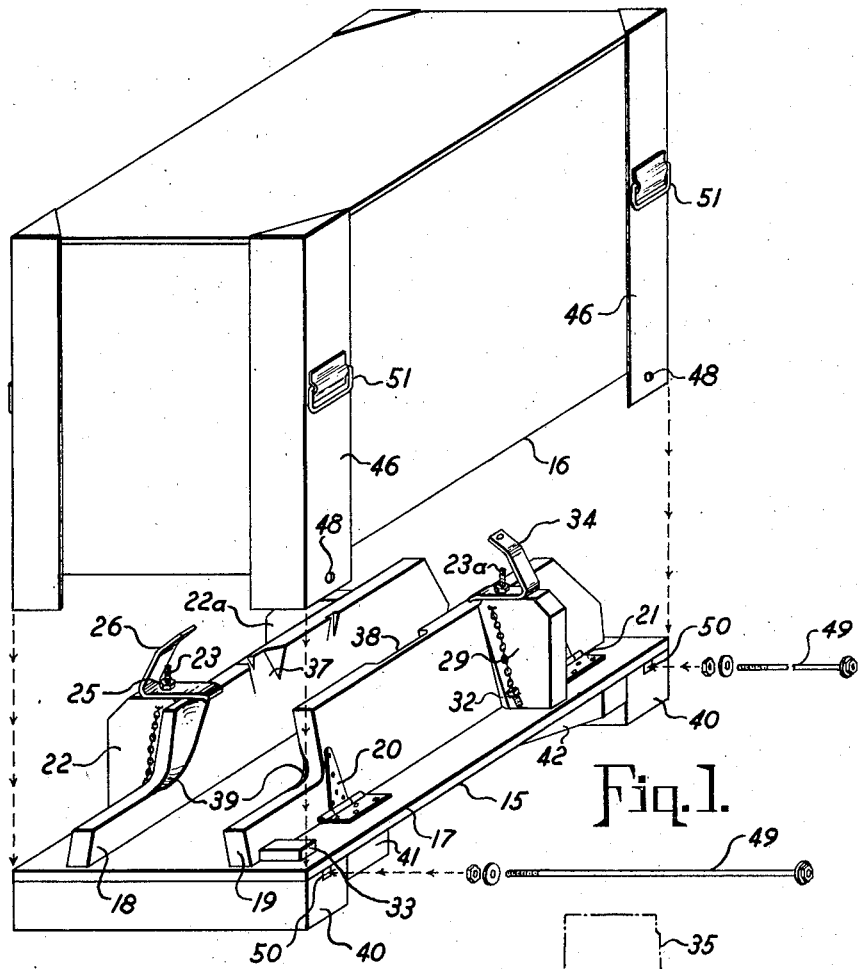
Figs. 1 is a perspective view of a device embodying my invention, with parts in adjusted position for illustrative purposes.

Fig. 6 is a rear elevational view of the motor cradle.

Fig. 7 is a perspective view of one of the tie rods employed to hold in place the members illustrated in Figs. 8 and 9.

Fig. 8 is a perspective view of one of the bracket supporting members.

Fig. 9 is a perspective view of the other bracket supporting member.

Fig. 10 is a side elevation of the cover.

Fig. 11 is a section taken substantially on the line 11—11 of Fig. 10.

Fig. 12 is a section taken substantially on the line 12—12 of Fig. 10.

Fig. 13 is an enlarged detail perspective view of the corner re-enforcing members for the cover.

Referring now more particularly to the drawings (Fig. 1), it will be understood that in general my device consists of a cradle 15 and a housing or cover 16, each of which is described more particularly hereinafter.

The cradle 15 may be made of wood, or other suitable material, and is provided with a base member 17 upon which are mounted stringers 18 and 19 which are adapted to support either a V type motor such as the Ford V8, or a vertical motor such as the Chevrolet or Plymouth.

The stringer 18 is preferably permanently fixed to the base 17, whereas the stringer 19 is secured to the base 17 by means of hinges 20 and 21. Both the stringers 18 and 19 are beveled along their contacting edges with the base 17 so that they normally incline inwardly.

The stringer 18 is provided with backing blocks 22 and 22a which are preferably secured in position by means of a tie rod 23 which extends through a longitudinal bore 30 (Fig. 9) and through a suitable aperture in the base 17. The tie rod 23 is threaded to engage a nut 25, and is also adapted to secure in position a bracket 26 which is supported on the upper edges of the stringer 18 and backing block 22.

The bracket 26 is provided with an aperture adapted to accommodate a studbolt 27 (Fig. 2) whereby the motor block 28, which in this instance is a Ford V8 motor (Fig. 2), may be secured in position. The studbolt 27 is preferably attached to a chain 27a which is in turn attached to the backing block 22 so that the studbolt 27 will not become lost when not in use.

The stringer 19 is also provided with a backing block 29 which is similarly secured in position by a tie rod 23a which extends through a longitudinal bore 30. The inclined edge 31 of the backing block 29 is rounded as at 32 so that the backing block 29 may be pivoted about the tie rod 23a, whereby the backing block 29 may be brought into locking position as shown in Fig. 1, or may be pivoted out of locking position to permit the stringer 19 to be moved into a vertical position on the hinges 20 and 21. The tilting of the stringer 19 into vertical position is necessary to permit the removal of a V type motor 28 (Fig. 2) because of the shape of its oil pan 28a. A locating block 33 is positioned on the bed 17 and serves to locate the cover 16 when the latter is in position over the cradle 15.

A bracket 34, similar to the bracket 26, is also supported on the upper edges of the stringer 19 and backing block 29, and serves the same purpose as the bracket 26.

Figures 2, 3:
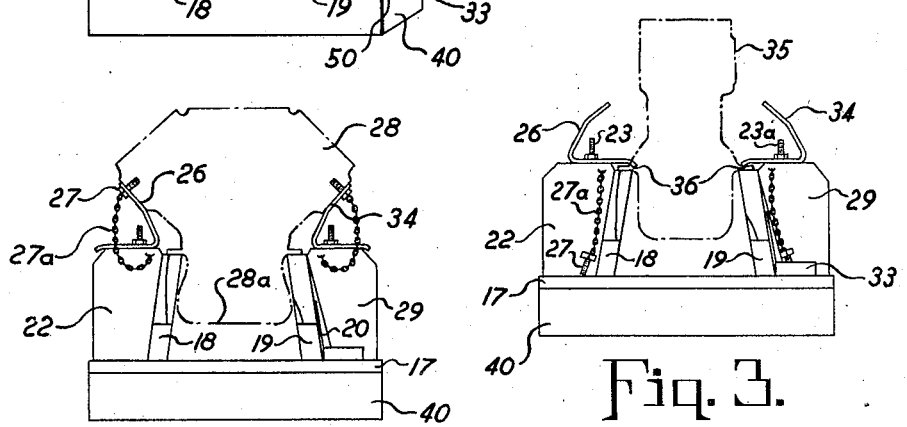
Fig. 2 is an end elevational view of the cradle illustrated in Fig. 1 with a V type motor in carrying position.
Fig. 3 is a view similar to Fig. 2 but showing a vertical type motor in position for transportation on the cradle.

It will be noted that the brackets 26 and 34 (Figs. 2 and 3) are swung into one position to hold a V type motor 28 and are swung into the opposite position to secure a vertical motor 35 (Fig. 3). When the device is used to carry a vertical motor 35 (Fig. 3), the motor flanges 36 rest on the upper edges of the stringers 18 and 19, and the lower ends of the brackets 26 and 34 are adapted to ride on top of the flanges 36 and hold them down.

The stringers 18 and 19 are provided with suitable cut-out portions 37, 38, and 39 to accommodate certain extending parts of the motor assembly, including the clutch housing.

On the under side of the base 17, I provide foot members 40 which serve as supports for the base 17 and provide clearance between the base member 17 and the floor so that a hoisting device may be inserted under the cradle 15 whereby the assembly may be easily lifted. Re-enforcing members 41, 42, and 43, arranged in the form of a Z (Figs. 1, 4, and 5), provide additional strength for the cradle 15.

The cover 16 may be made of any suitable material, but in order to save weight, I prefer to form the top, sides, and ends of plywood panels secured together and re-enforced as hereafter described.

Referring to Fig. 12, it will be seen that the inside of the top of the cover member 16 is re-enforced by means of horizontal members 44, and the corners are re-enforced by means of inside vertical members 45 and metal corner pieces 46, all of which are secured in position by means of bolts and nuts 47, or other suitable means. The metal corner members 46 extend below the sides and ends of the cover 16, and are provided near their lower extremities with apertures 48 adapted to accommodate tie bolts 49 (Fig. 1), which tie bolts 49 also extend through slots 50 formed in the upper portion of the foot members 40 to lock the cover 16 securely in place on the cradle 15.

When the cover 16 and cradle 15 are secured together as hereinabove described, the entire assembly may be manually lifted by means of the handles 51 which are preferably welded to the re-enforcing corner members 46.

Having described my invention, what I claim and desire to secure by Letters Patent is:

1. A device of the character described, comprising a cradle adapted to support an automobile motor the said cradle being provided with a pair of inwardly inclined longitudinal stringers, one of which is hinged for outward movement, there being backing blocks on the outside of said stringers arranged to prevent their outward displacement, and a bracket mounted on the upper edge of each of said backing blocks.

2. A device of the character described, comprising a cradle to support an automobile motor and a housing for said cradle the cradle being provided with a pair of inwardly inclined longitudinal stringers, one of which is hinged for outward movement, there being backing blocks on the outside of said stringers arranged to prevent their outward displacement, and a bracket mounted on the upper edge of each of said backing blocks, said brackets being pivotably mounted for rotation into and out of working position.

3. A device of the character described, comprising a cradle adapted to support an automobile motor, and a housing for said cradle, the said cradle being provided with a pair of inwardly inclined longitudinal stringers, one of which is hinged for outward movement; backing blocks on said cradle outside of said stringers and adapted to prevent the outward displacement of said stringers, the backing block for said hinged stringer having a longitudinal bore and a bolt therein for attachment to the cradle, whereby it may be axially rotated into and out of locking position with respect to said hinged stringer.

4. The combination defined in claim 3, in which said axially rotatable backing block is provided with an inclined side wall adapted to abut the wall of said stringer, said side wall being convexly curved.

HOWARD N. NUTT.

REFERENCES CITED

The following references are of record in the file of this patent:

UNITED STATES PATENTS

| Number | Name | Date |
| --- | --- | --- |
| 250,986 | Smith | Dec. 13, 1881 |
| 919,798 | Weinact | Apr. 27, 1909 |
| 1,368,606 | Cole | Feb. 15, 1921 |
| 1,484,736 | Patrick et al. | Feb. 26, 1924 |
| 1,661,527 | Boer | Mar. 6, 1928 |
| 1,673,324 | Gardner | June 12, 1928 |
| 2,341,801 | Miller | Feb. 15, 1944 |